March 23, 1937. E. B. BRANNAN 2,074,889
COMPENSATING VOLUME CONTROL SAFETY DEVICE
Filed May 16, 1936  2 Sheets-Sheet 1
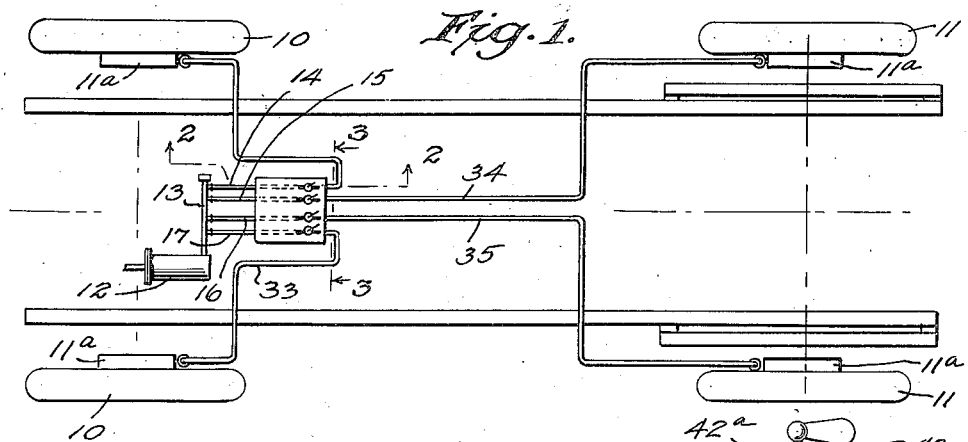
Fig. 1.
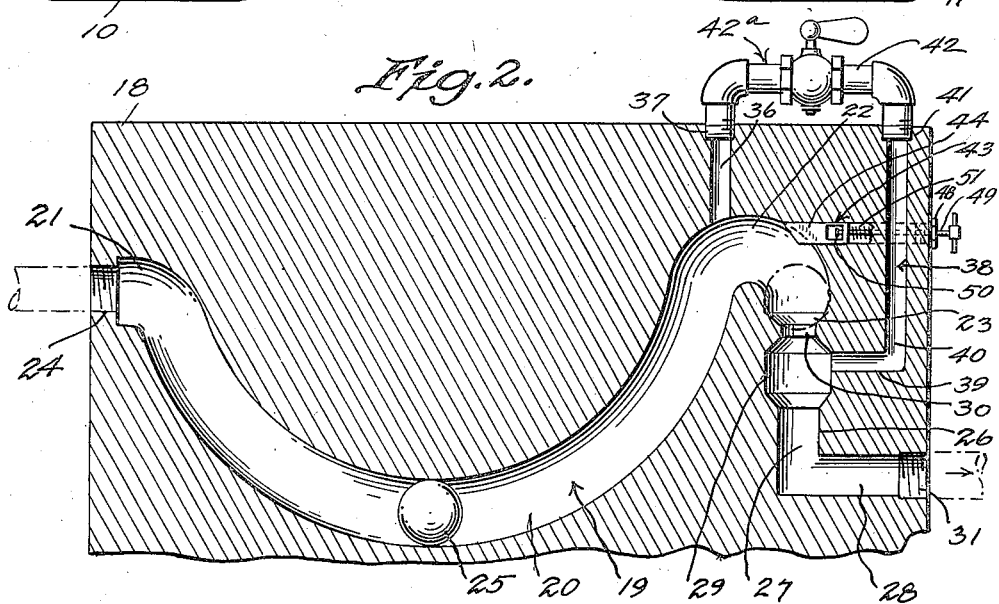
Fig. 2.
Fig. 3.
Inventor
Eldred B. Brannan
By Kimmel & Crowell
Attorneys March 23, 1937.  E. B. BRANNAN  2,074,889
COMPENSATING VOLUME CONTROL SAFETY DEVICE
Filed May 16, 1936  2 Sheets-Sheet 2

Inventor
Eldred B. Brannan

Kimmel & Crowell
Attorneys

Patented Mar. 23, 1937

2,074,889

UNITED STATES PATENT OFFICE 2,074,889

COMPENSATING VOLUME CONTROL SAFETY DEVICE

Eldred B. Brannan, Alcova, Wyo., assignor of twenty-five per cent to David H. Dunham and twenty-five per cent to George L. Niles, both of Alcova, Wyo.

Application May 16, 1936, Serial No. 80,161

3 Claims. (Cl. 303—84)

This invention relates to a compensating volume control safety device for use in conjunction with air and hydraulic pressures travelling through one or more conduits supplied from a single source of pressure, and aims to automatically close a conduit in case of a leak or break in the latter to prevent the waste of pressure.

The safety device, in accordance with this invention is designed primarily for use in connection with hydraulic brakes of the four-wheel type for automotive vehicles, but it is to be understood that a safety device, in accordance with this invention may be employed in any connection for which it may be found applicable, and the invention has for its object to provide, in a manner as hereinafter set forth, a safety device when forming a part of a hydraulic braking system for the front and rear wheels of an automotive vehicle acting to automatically close the flow of pressure only through that pressure conducting line leading to a brake unit when a break or leak develops in such line whereby a waste of pressure from the system is prevented and the danger of the entire braking system being rendered inoperative is obviated.

Further objects of the invention are to provide, in a manner as hereinafter set forth, a compensating volume control safety device which is simple in its construction and arrangement, strong, durable, compact, readily installed with respect to a pressure conduit, thoroughly efficient in its use, conveniently repaired when occasion requires, formed of detachably connected together parts permitting of an impaired part being detached and a non-impaired part substituted therefor without discarding the non-impaired parts, and comparatively inexpensive to manufacture.

With the foregoing and other objects in view, the invention consists of the novel construction, combination and arrangement of parts as will be more specifically described and are as illustrated in the accompanying drawings wherein are shown embodiments of the invention, but it is to be understood that changes, variations and modifications may be resorted to which fall within the scope of the invention as claimed.

In the drawings:—

Figure 1 is a top plan view of a hydraulic braking system for use in connection with the front and rear wheels of an automobile vehicle and further illustrating the adaptation therewith of a set of compensating volume control safety devices in accordance with this invention.

Figure 2 is a section on line 2—2 Figure 1.

Figure 3 is a section on line 3—3 Figure 1.

Figure 4:
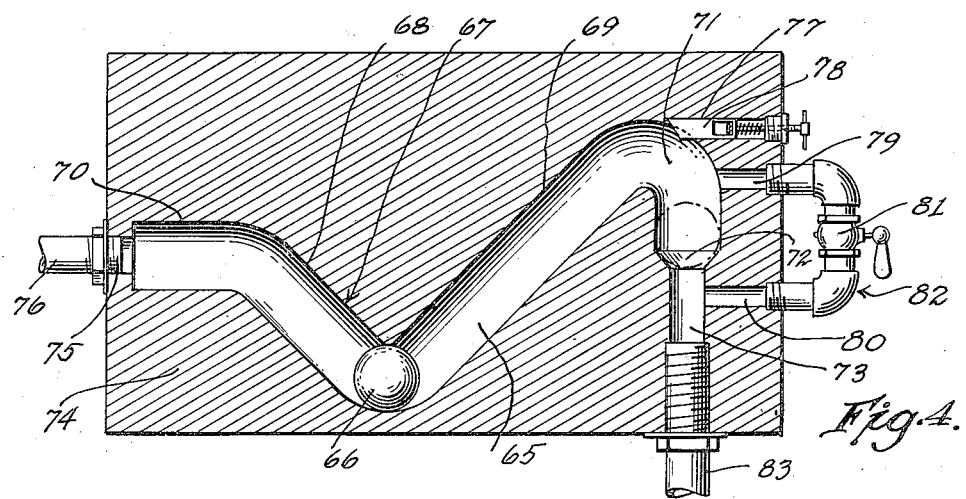
Figure 4 is a longitudinal sectional view of still another modified form of safety device in accordance with this invention.

The form of the device shown in Figures 1 and 4 includes a valve chamber of annular cross section and when but one of such devices is employed such chamber is formed from a tubular member of the desired contour in side elevation, and this statement applies to a section of a pressure conducting line leading from the valve chamber to a point of application, as well as a valve controlled by-pass leading from the valve chamber to the said section of the conducting line, but when a plurality of such devices are employed, the valve chambers, a portion of each by-pass and a portion of each line are formed in one block.

With reference to Figure 1 the front and rear wheels of an automotive vehicle are indicated at 10, 11 respectively. Each of said wheels is provided on its inner side with a pressure operated brake mechanism 11a. A master cylinder constituting a pressure reservoir is indicated at 12. Leading from the cylinder 12 is a horizontally disposed pressure supply pipe 13 which is common to the forward end sections 14, 15, 16 and 17 of four pressure conducting lines.

A block indicated at 18 forms a part of the safety device and which is provided with four parallel spaced valve chambers 19, only one shown. The chambers 19 are of like form and each consists of an intermediate stretch 20 of segmental contour, a horizontal forward end stretch 21 disposed at right angles to the forward end of the stretch 20 and a rear end stretch 22 substantially of arcuate contour having its rear end depending below its forward end. The stretch 21 at its rear end opens into the forward end of stretch 20. The rear end of stretch 20 opens into the forward end of stretch 22. The rear end of stretch 22 is of beveled contour to provide a ball valve seat 23. The block 18 is formed at its forward end with four spaced parallel threaded openings 24, only one shown and which open into and are of less diameter than the forward end stretches of the valve chambers. The forward end sections 14, 15, 16 and 17 of the four pressure conducting lines are secured in the openings 24 and communicate with the forward end stretch of the valve chambers. These latter are of annular contour in transverse cross section. Freely movable in each of the valve chambers 19 is a ball valve 25 capable of seating on the valve seat 23 under a certain condition, to be referred to for closing the rear end of the valve chamber 19 to arrest the flow of pressure therethrough.

The block 18 is formed with four parallel angle-shaped channels 26, only one shown and of like form. Each channel 26 includes a vertical leg 27 and a rearwardly extending horizontal leg 28 which opens at its forward end into the lower end of leg 27 and at its rear end opens at the rear end of the block. The leg 27 has an enlarged portion 29 intermediate its ends and a reduced upper end 30 which merges into the reduced rear end of the stretch 22. The rear end of leg 28 is formed with screw threads 31. The channels 26 provide the intermediate sections of the four pressure conducting lines. Connected to the threads 31 of the four channels 26 are the rear sections 32, 33, 34 and 35 of the pressure conducting lines. The section 32 leads to the brake mechanism carried by one of the vehicle's front wheels; the section 33 leads to the brake mechanism carried by the other of the vehicle's front wheels; the section 34 leads to the braking mechanism of one of the vehicle's rear wheels and the section 35 leads to the braking mechanism of the other one of the vehicle's rear wheels.

The block 18 is formed with four vertically disposed spaced parallel channels 36 of like form and only one shown. Each channel 36 at its upper end opens at the top of the block 18, has a threaded upper end terminal portion 37 and opens at its lower end into the stretch 22 of chamber 19. The block 18 rearwardly of channels 36 is formed with four angle-shaped channels 38 of like form, only one shown. Each channel 38 is formed of a forwardly extending horizontal leg 39 and a vertical leg 40. The leg 39 at its forward end opens into the enlarged portion 29 of the leg 27 and at its rear end opens into the lower end of the leg 40. The latter opens at its upper end at the top of block 18 and has a threaded upper terminal portion 41.

A channel 36 associates with a channel 38 and connected to the threaded terminal portions 41 of the said associated channels is an inverted yoke-shaped valve controlled pipe element 42 which provides in connection with the said pair of associated channels a by-pass 42ª.

The block 18 is formed with four spaced parallel bores 43 of like form, only one shown. Each bore 43 opens at its forward end into the rear side of the rear end of the stretch 22 of the chamber 19. The major portion of bore 43 is square and its remaining portion, which is at the rear end of the bore is annular and threaded. Slidably mounted in the bore 43 and normally extending into the stretch 22 is a spring controlled valve stop 44 for the valve 25. The stop 44 is of square cross section and has a beveled forward end 45. The stop 44 in proximity to its rear end is formed with a transverse slot 46 opening at its sides. The rear end of stop 44 has an opening 47 which communicates with the slot 46. Engaging with the threaded portion of the bore 43 is an internally and externally threaded flanged bushing 48. Threadedly engaging with the bushing 48 is a manually operated threaded adjusting stem 49 for the stop 44. The stem 49 slidably extends through the opening 47 into slot 46 and has its forward end headed, as at 50. Interposed between the stop 44 and the bushing 48 and surrounding the stem 49 is a controlling spring 51 for the stop 44.

The valve 19 when shifted by the pressure applied forwardly therein, when such pressure overcome the pressure rearwardly of the valve engages the seat at the rear end of the stretch 22 and shuts off a supply of pressure to channel 26, and on its shift towards the valve seat, it will force stop 46 rearwardly against the action of the controlling spring for the latter and clear the stop to engage said seat. After the valve is seated, it cannot be moved or shifted forwardly through stretch 22, as the controlling spring for the stop 46 has positioned the latter in the forward path of the valve whereby the stop will arrest the valve. It is necessary, to permit the valve to pass forwardly through stretch 22 into stretch 20, to operate the stem 49 in a direction to shift the stop clear of the interior of the stretch 22. After the valve has entered the stretch 20, the stem 49 is adjusted in a direction to position the stop into the stretch 22. The normal or neutral position of the valve 25 is as shown in Figure 2. The manner of unseating valve 25 to return it to normal or neutral position will now be set forth. After the line is repaired, the by-pass is opened and the line is bled to expel any air and then after bleeding, the bleeder valve is closed and an application of brake is made filling the wheel cylinder. While brake pedal is still held down in application position, the by-pass is closed, then brake pedal is released and the return spring pressure in wheel forces the wheel cylinder to contract thus forcing brake fluid back through the line to master cylinder. The sudden surge of fluid returning through the brake line will unseat ball and it will return to its normal or neutral position. The valve controlled by-pass provides for the passage of pressure from the valve chamber 19 into the channel 26 and for equalizing the pressure forwardly and rearwardly in relation to valve 25.

Figure 5:
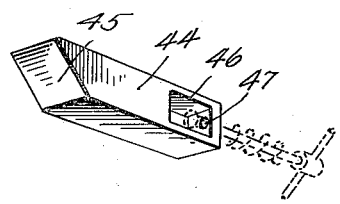
Figure 5 is a perspective view of the spring controlled adjustable stop for the valve member of the forms of the devices shown in Figures 1, 2 and 4.

With reference to Figure 4, the valve chamber 65 for the ball valve 66 is formed of a V-shaped intermediate stretch 67 having its forward arm 68 of less length than its rear end 69. The latter extends above the arm 68. The chamber 65 includes a forward end stretch 70 disposed at right angles to and opening at its rear end into the upper end of arm 68. The chamber 65 includes an upstanding rear end stretch 71 of elbow contour merging at its upper end into the upper end of the arm 69. The lower end of stretch 71 is beveled to provide a seat 72 for valve 66. The lower end of stretch 71 merges into the intermediate section 73 of a pressure conducting line. The chamber 65 and line section 73 are formed in a block 74. The forward end of the latter has an opening 75 which communicates with stretch 70 and has secured therein the forward section 76 of the pressure conducting line. The block 74 is formed with a bore 77 which opens into the stretch 71 and has arranged therein a valve stop 78 of the same form as the one shown in Figures 1, 2 and 5. The block 74 is formed with a pair of superposed channels 79, 80. The channel 79 opens into the stretch 71 below the stop 78. The channel 80 opens into the line section 73. The channels 79, 80 are connected together by a valve controlled pipe element 81 which in connection with said channels provides a valve controlled by-pass 82. The rear section of the pressure conducting line is designated 83 and is connected to the section 73.

The device shown by Figure 4 operates in the same manner as the device shown by Figure 1.

When pressure is reduced in the rear section of a pressure conducting line, due to a leak or break and with respect to the structure shown in Figure 2, the valve 25 seats to close valve chamber 19 to such section; with respect to the structure shown in Figure 4, the valve 66 seats to close valve chamber 65 to such section.

What I claim is:

1. A safety device for the purpose set forth comprising a valve chamber adapted for interposition between the leading and follower section of a pressure conducting line and formed of an intermediate stretch, a front end stretch constituting an intake and a rear end stretch constituting an outlet, said rear end stretch having its rear end formed to provide a valve seat, said front and rear end stretches opening respectively into leading and follower sections of the pressure conducting line, a shiftable ball valve loosely mounted in said chamber and shiftable in a direction on a reduction of pressure in the follower section of said line to engage said seat to close said chamber to the said follower section, a valve controlled by-pass opening into said rear end stretch and into said follower section, and a spring controlled manually adjusted stop extending into said rear end stretch for normally arresting the shifting of the valve from its seat into said intermediate stretch.

2. A safety device for the purpose set forth comprising a valve chamber adapted for interposition between the leading and follower sections of a pressure conducting line and formed of an intermediate stretch, a front end stretch constituting an intake and a rear end stretch constituting an outlet, said rear end stretch having its rear end formed to provide a valve seat, said front and rear end stretches opening respectively into leading and follower sections of the pressure conducting line, a shiftable ball valve loosely mounted in said chamber and shiftable in a direction on a reduction of pressure in the follower section of said line to engage said seat to close said chamber to the said follower section, a valve controlled by-pass opening into said rear end stretch and into said follower section, and a spring controlled manually adjusted stop extending into said rear end stretch for normally arresting the shifting of the valve from its seat into said intermediate stretch, said stop being located between and in spaced relation to the terminals of said by-pass.

3. A safety device for the purpose set forth comprising a valve chamber adapted for interposition between the leading and follower sections of a pressure conducting line and formed of an intermediate stretch, a front end stretch constituting an intake and a rear end stretch constituting an outlet, said rear end stretch having its rear end formed to provide a valve seat, said front and rear end stretches opening respectively into leading and follower sections of the pressure conducting line, a shiftable ball valve loosely mounted in said chamber and shiftable in a direction on a reduction of pressure in the follower section of said line to engage said seat to close said chamber to the said follower section, a valve controlled by-pass opening into said rear end stretch and into said follower section, and a spring controlled manually adjusted stop extending into said rear end stretch for normally arresting the shifting of the valve from its seat into said intermediate stretch, said stop being located forwardly of the point of communication of said by-pass with said rear end stretch.

ELDRED B. BRANNAN.